(12) United States Patent
Vezzosi et al.

(10) Patent No.: US 8,230,987 B2
(45) Date of Patent: Jul. 31, 2012

(54) FLUID DIVERTER

(75) Inventors: William Orville Vezzosi, Livonia, MI (US); Terrence Joseph Ceccarelli, Allen Park, MI (US); Jamie Brent Harris, Westland, MI (US); Warren Brian Stobbe, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 823 days.

(21) Appl. No.: 12/185,859

(22) Filed: Aug. 5, 2008

(65) Prior Publication Data

US 2010/0032025 A1 Feb. 11, 2010

(51) Int. Cl.
*B65G 11/20* (2006.01)
*F01M 11/04* (2006.01)
(52) U.S. Cl. .......... 193/17; 137/351; 137/234.6; 192/22
(58) Field of Classification Search .................. None
See application file for complete search history.

(56) References Cited

U.S. PATENT DOCUMENTS

| | | | |
|---|---|---|---|
| 3,303,948 A * | 2/1967 | Peruski | 414/334 |
| 3,354,989 A | 11/1967 | Anderson | |
| 5,078,281 A | 1/1992 | Johnson | |
| 5,501,402 A * | 3/1996 | Jones | 239/650 |
| 5,620,018 A | 4/1997 | Carpenter et al. | |
| 5,803,140 A | 9/1998 | Jodoin | |
| 5,857,503 A | 1/1999 | Vreeken | |
| 6,093,094 A * | 7/2000 | Uecker et al. | 453/16 |
| 6,227,263 B1 | 5/2001 | Kust et al. | |
| 6,401,770 B1 | 6/2002 | Elmer | |
| 6,718,788 B1 | 4/2004 | Shuck | |

* cited by examiner

*Primary Examiner* — Kavel Singh

(57) ABSTRACT

A fluid diverter comprising: a fluid diverting structure having a top, fluid striking surface having side and rear walls and a forward mouth, the side and rear walls preventing fluid from spilling over edges of the surface as such fluid exits through the mouth; and a magnet assembly mounted to a bottom surface of the fluid diverting structure. The magnet assembly, comprises: a magnet, and a pivot structure affixed to the magnet and pivotally mounted to the bottom surface of the fluid diverting structure for pivoting the magnet assembly relative to the fluid diverting structure about an axis to pitch the fluid diverting structure to a desired pitch angle and then once at such desired pitch angle, locking the fluid diverting structure at such desired pitch angle.

6 Claims, 5 Drawing Sheets

FLUID DIVERTER

TECHNICAL FIELD

This invention relates generally to fluid diverters and more particularly to fluid diverts used to divert engine fluids such as engine oils and transmission fluid into a container while the vehicle is on a lift.

BACKGROUND

As is known in the art, when draining any fluid from a vehicle into a container there is an issue of clearance for the fluid diverter used to divert the engine fluids into the container.

SUMMARY

In accordance with the present invention, a fluid diverter is provided, comprising: a fluid diverting structure having a top, fluid striking surface having side and rear walls and a forward mouth, the side and rear walls preventing fluid from spilling over edges of the surface as such fluid exits through the mouth; and a magnet assembly mounted to a bottom surface of the fluid diverting structure. The magnet assembly, comprises: a magnet, and a pivot structure affixed to the magnet and pivotally mounted to the bottom surface of the fluid diverting structure for pivoting the magnet assembly relative to the fluid diverting structure about an axis to pitch the fluid diverting structure to a desired pitch angle and then once at such desired pitch angle, locking the fluid diverting structure at such desired pitch angle.

In one embodiment, the pivot structure includes: a pair of U-shaped brackets, a first one of the brackets having a base affixed to the bottom surface and a pair of arms extending perpendicularly to the base, and a second one of the brackets affixed to the magnet, such second one of the brackets having a pair of arms extending perpendicularly to a base of the second one of the brackets; an axle passing axially through holes in the arm of the first and second brackets; and wherein the second one of the brackets pivots relative to the first one of the brackets about the axle.

In one embodiment, the axle comprises a bolt having threads at an end thereof for a receiving wing-nut threaded thereon and wherein when the wing-nut is loosened, the first one of the brackets is able to pivot about the bolt and thereby enable the surface to pitch to the desired pitch angle and then once at such desired pitch angle, the wing-nut to be tightened to lock the surface at such desired pitch angle.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
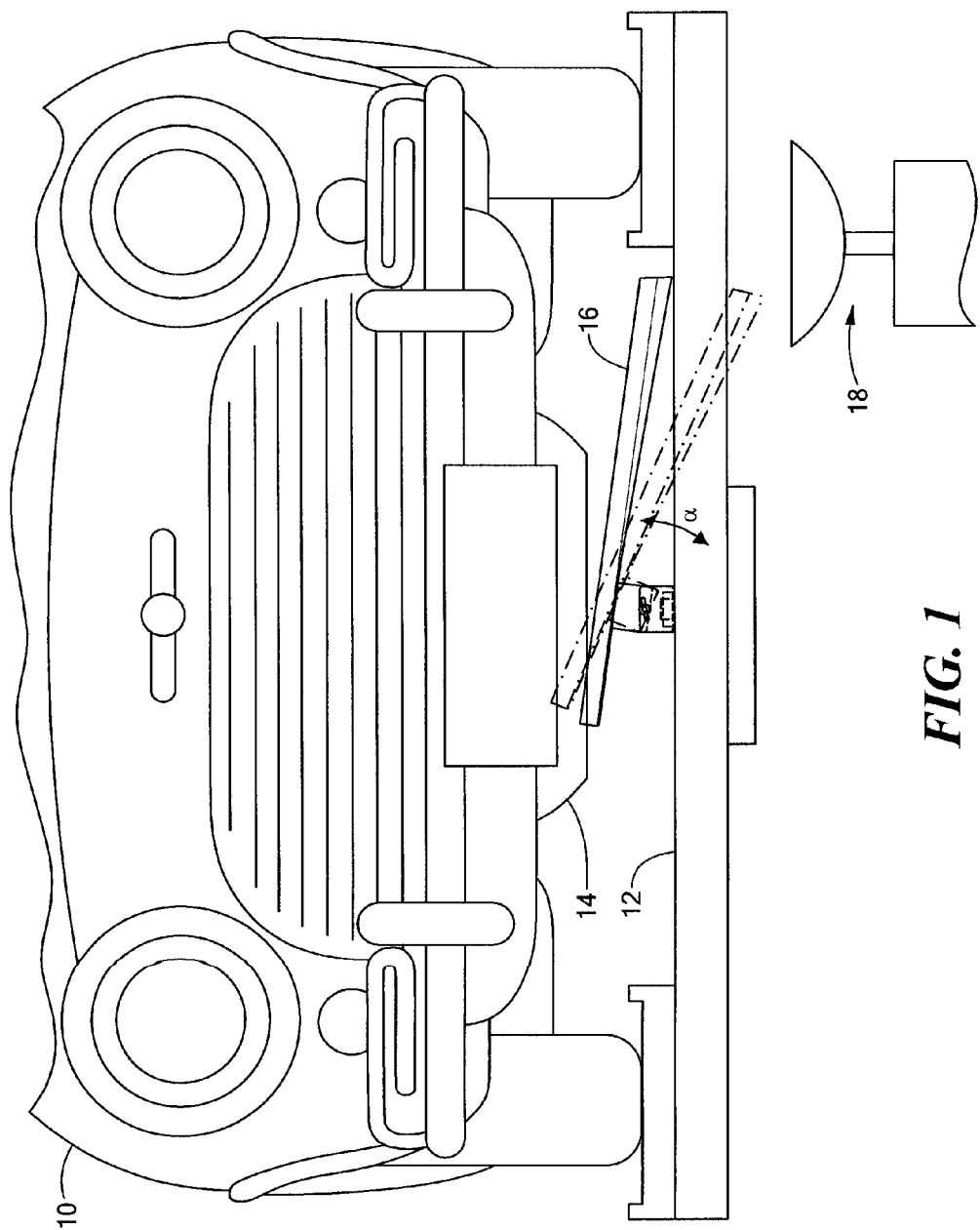
FIG. 1 is a sketch of a vehicle on a list and positioned relative to a fluid diverter according to the invention.

Referring now to FIG. 1, a motor vehicle 10 is shown on a lift, here a twin post hoist 12 with the engine oil pan 14 thereof positioned under a fluid diverter 16 (shown in more detail in FIGS. 2-8). Engine oil is drained from the pan 14 into a surface of the fluid diverter 16 where such drained engine oil is collected in a container drum 18.

Figure 2:
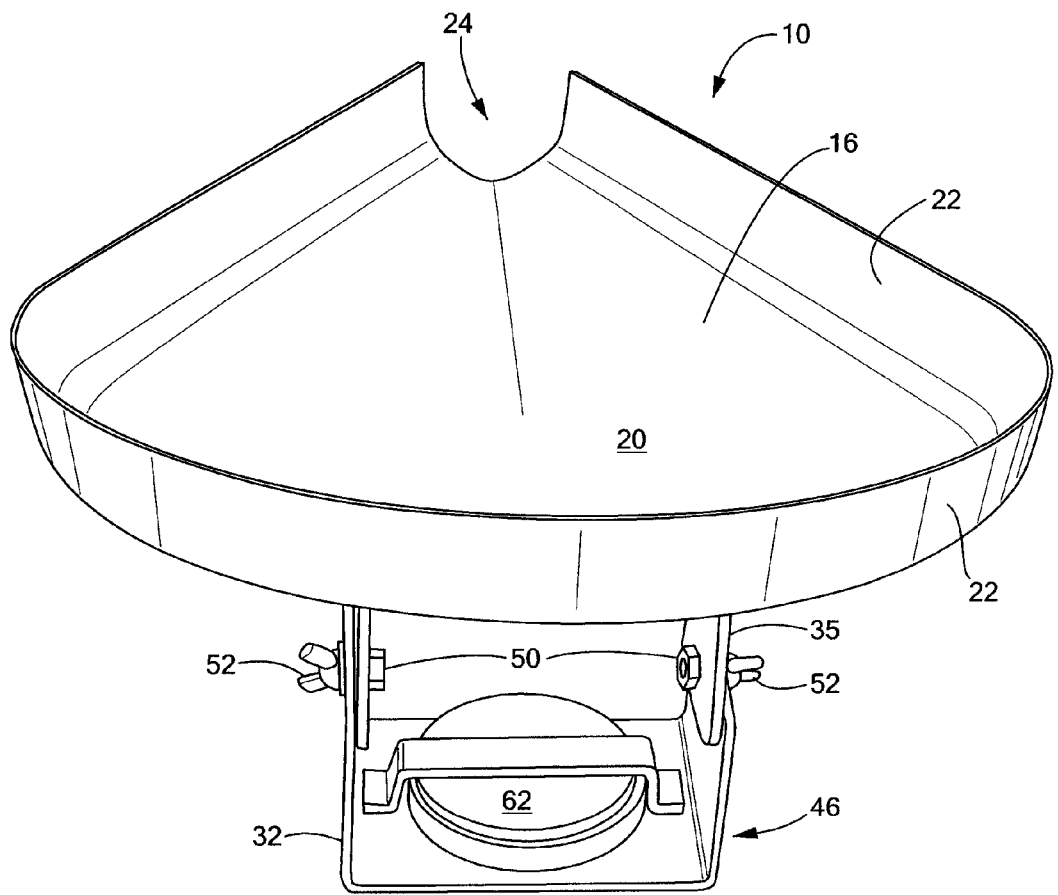
FIG. 2 is a sketch of a the diverter of FIG. 1 according to the invention.
Figure 3:
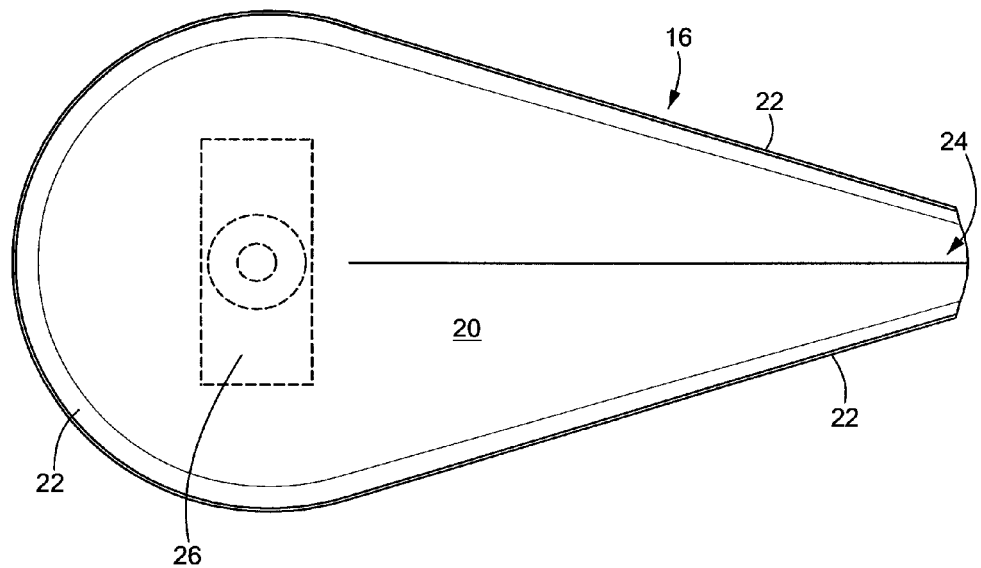
FIG. 3 is a top view of the diverter of FIG. 1 according to the invention.
Figure 4:
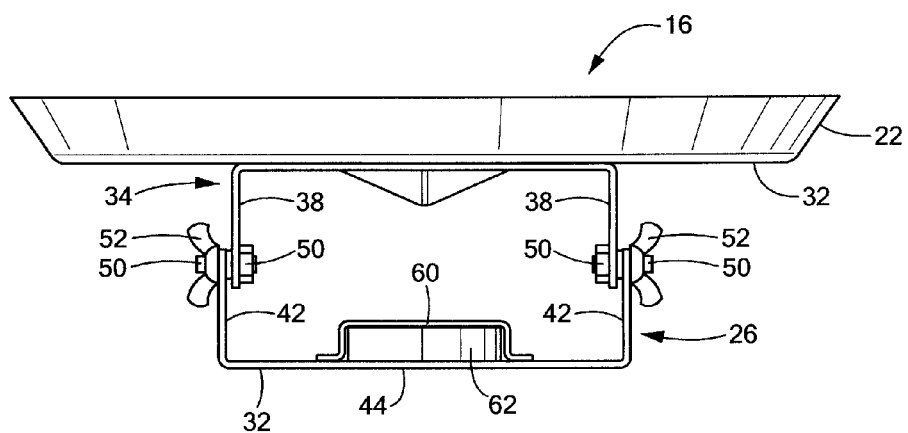
FIG. 4 is a rear view of the diverter of FIG. 1 according to the invention.
Figure 5:
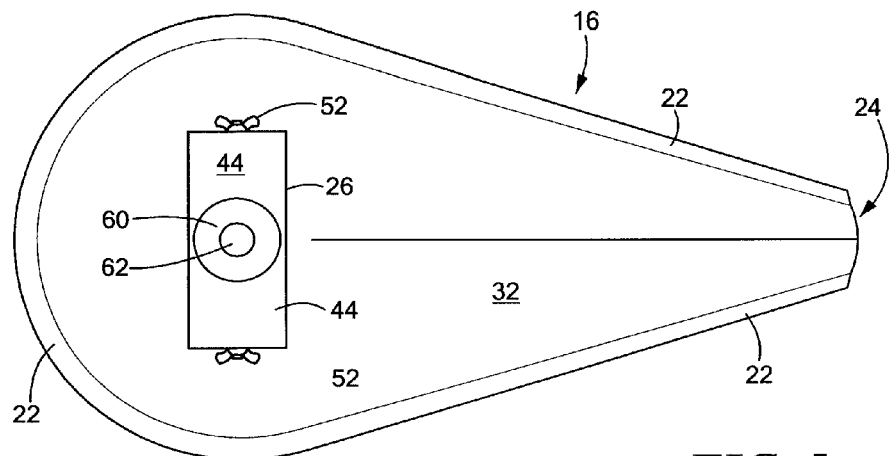
FIG. 5 is a bottom view of the diverter of FIG. 1 according to the invention.
Figure 6:
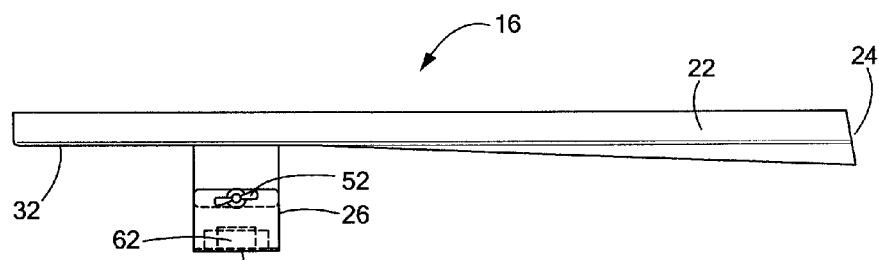
FIG. 6 is a side elevation view of the diverter of FIG. 1 according to the invention with such diverter is a horizontal position.
Figure 7:
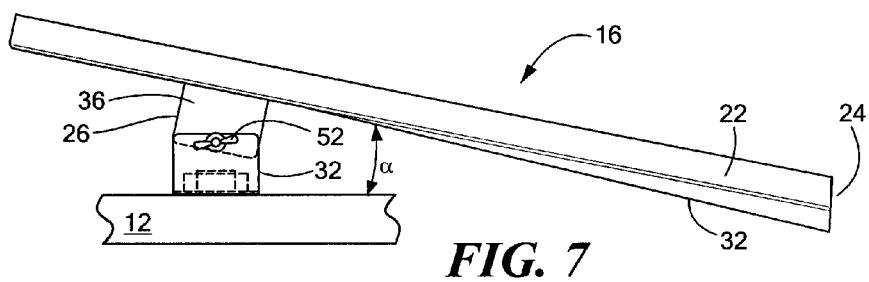
FIG. 7 is a side elevation view of the diverter of FIG. 1 according to the invention with such diverter is a pivoted position.
Figure 8:
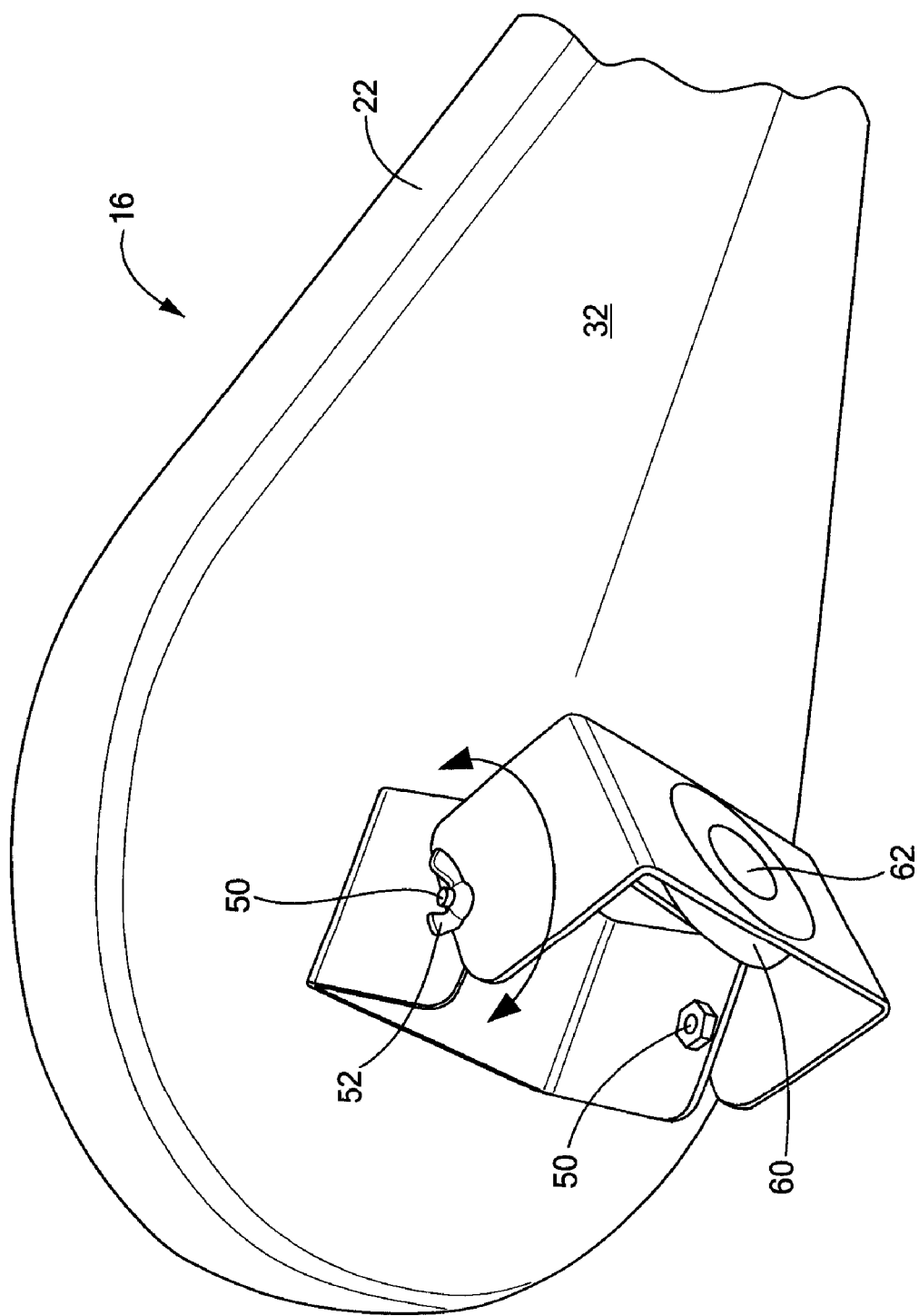
FIG. 8 is a perspective view of the bottom of the diverter of FIG. 2, such view showing a magnet assembly of the diverter in a pivoted position.

Referring now to FIGS. 2-8, the diverter 16 has a top, pear shaped fluid diverting surface 20 with here, for example, one inch side and rear walls 22 to prevent fluid from spilling over the edge of the surface 20 as such fluid exits the forward opened mouth or spout 24. The surface 20 is trough shaped having a recessed middle portion, as indicated in FIG. 2.

A magnet assembly 30 is affixed to the rearward region of the bottom surface 32 of the diverter 16. The magnet assembly 30 includes a pair of U-shaped brackets 32, 34. Bracket 34 has the base 36 thereof affixed to the bottom surface 32, here welded, shown more clearly in FIG. 4 and a pair of arms 40 extending perpendicularly to the base 36. The bracket 32 has a pair of arms 42 extending perpendicularly to a base 34 of bracket 32. Bolts 50 pass axially through holes in the arms 38, 42. The bolts 50 have threads at ends thereof for receiving wing nuts 52 threaded thereon. When the wing-nuts are loosened, the surface 32 is able to pivot to a angularly about the axis of the bolts and thereby enable the surface to pitch to a desired pitch or elevation angle, α, (FIGS. 1 and. 7) and then once at such desired pitch or elevation angle, α, the wing-nuts 52 are tightened to lock the surface at such desired pitch or elevation angle, α. The angle, α, allows for the spout 24 to be raised or lowered yo thereby adjust the speed or amount of fluid to reach the container 18 (FIG. 1). The depression at the bottom of the diverter also reduces the fluid flow as well.

A magnet 62 (FIG. 4) is affixed to bracket 44 by a third U-shaped bracket 60; such bracket 60 being welded to the bracket 32, as shown. The magnet 62 attaches the diverter to the lift 12 (FIG. 1)

A number of embodiments of the invention have been described. Nevertheless, it will be understood that various modifications may be made without departing from the spirit and scope of the invention. Accordingly, other embodiments are within the scope of the following claims.

What is claimed is:

1. A fluid diverter, comprising:
    a fluid diverting structure having a bottom member, the bottom member having a top, fluid striking surface and fixed side and rear walls and a forward mouth, the side and rear walls preventing fluid from spilling over edges of the surface as such fluid exits through the mouth;
    a magnet assembly mounted to a bottom surface of the bottom member of the fluid diverting structure, such magnet assembly, comprising:
        a magnet, and
        a pivot structure having:
            a first member thereof affixed to the bottom member of the fluid diverting structure; and
            a second member pivotally mounted to the first member and affixed to the magnet
        for pivoting second member and the magnet relative to the first member and the bottom member of the fluid diverting structure about an axis to pitch the bottom member of the fluid diverting structure to a desired pitch angle relative to the second member and then once at such desired pitch angle, locking the fluid diverting structure at such desired pitch angle.

2. The fluid diverter recited in claim 1 wherein the first member and the second member of the pivot structure includes:
- a pair of U-shaped brackets, a first one of the brackets having a base affixed to the bottom member of the fluid diverting structure and a pair of arms extending perpendicularly to the base, and a second one of the brackets affixed to the magnet, such second one of the brackets having a pair of arms extending perpendicularly to a base of the second one of the brackets;
- an axle passing axially through holes in the arm of the first and second brackets; and
- wherein the second one of the brackets pivots relative to the first one of the brackets about the axle.

3. The diverter recited in claim 2 wherein the axle comprises a bolt having threads at an end thereof for a receiving wing-nut threaded thereon and wherein when the wing-nut is loosened, the first one of the brackets is able to pivot about the bolt and thereby enable the surface to pitch to the desired pitch angle and then once at such desired pitch angle, the wing-nut to be tightened to lock the surface at such desired pitch angle.

4. The diverter recited in claim 1 wherein the pivot structure is disposed between the magnet and the bottom surface of the fluid diverting structure.

5. A method for draining fluid from an engine of a motor vehicle, comprising:
- (A) raising the motor vehicle on a lift;
- (B) placing a fluid diverter on the lift under the motor vehicle to divert the drained fluid, such fluid diverter comprising:
  - (a) a fluid diverting structure having a top, fluid striking surface having side and rear walls and a forward mouth, the side and rear walls preventing the fluid from spilling over edges of the surface as such fluid exits through the mouth;
  - (b) a magnet assembly mounted to a bottom surface of the fluid diverting structure, such magnet assembly, comprising:
    - (i) a magnet, and
    - (ii) a pivot structure affixed to the magnet and pivotally mounted to the bottom surface of the fluid diverting structure for pivoting the magnet assembly relative to the fluid diverting structure about an axis to pitch the fluid diverting structure to a desired pitch angle and then once at such desired pitch angle, locking the fluid diverting structure at such desired pitch angle; and
- (C) magnetically affixing the diverter to the lift with the magnet.

6. A fluid diverter for draining fluid from an engine of a motor vehicle, comprising:
- (A) motor vehicle lift;
- (B) a fluid diverting structure having a bottom member, the bottom member having a top, fluid striking surface and fixed side and rear walls and a forward mouth, the side and rear walls preventing fluid from spilling over edges of the surface as such fluid exits through the mouth;
  - a magnet assembly mounted to a bottom surface of the bottom member of the fluid diverting structure, such magnet assembly, comprising:
    - a magnet, and
    - a pivot structure having:
      - a first member thereof affixed to the bottom member of the fluid diverting structure; and
      - a second member pivotally mounted to the first member and affixed to the magnet, the lift being magnetically affixed to the second member with the magnet
  - for pivoting second member and the magnet relative to the first member and the bottom member of the fluid diverting structure about an axis to pitch the bottom member of the fluid diverting structure to a desired pitch angle relative to the second member and then once at such desired pitch angle, locking the fluid diverting structure at such desired pitch angle.

* * * * *